United States Patent
Zwimpfer

(10) Patent No.: US 8,166,931 B2
(45) Date of Patent: May 1, 2012

(54) CARBURETOR AND TWO-STROKE ENGINE WITH A CARBURETOR

(75) Inventor: Markus Zwimpfer, Schwaikheim (DE)

(73) Assignee: Andreas Stihl AG & Co. KG, Waiblingen (DE)

( * ) Notice: Subject to any disclaimer, the term of this patent is extended or adjusted under 35 U.S.C. 154(b) by 197 days.

(21) Appl. No.: 12/795,763

(22) Filed: Jun. 8, 2010

(65) Prior Publication Data
US 2010/0326412 A1 Dec. 30, 2010

(30) Foreign Application Priority Data
Jun. 26, 2009 (DE) .................. 10 2009 030 593

(51) Int. Cl.
*F02B 25/00* (2006.01)
*F02M 1/10* (2006.01)

(52) U.S. Cl. ............. 123/73 PP; 123/73 AA; 123/73 R; 261/46; 261/44.6; 261/44.8; 261/23.3; 261/DIG. 1

(58) Field of Classification Search ............... 123/73 PP, 123/73 AA, 73 R; 261/46, 47, 63, 44.6, 44.8, 261/44.9, 23.3, DIG. 1
See application file for complete search history.

(56) References Cited

U.S. PATENT DOCUMENTS

| 5,709,822 | A * | 1/1998 | Togashi | 261/44.2 |
| 6,352,058 | B1 * | 3/2002 | Yuasa et al. | 123/73 R |
| 6,585,235 | B2 * | 7/2003 | Pattullo | 261/44.8 |
| 6,895,909 | B2 * | 5/2005 | Yuasa et al. | 123/73 PP |
| 7,093,570 | B2 * | 8/2006 | Mavinahally et al. | 123/73 D |
| 7,389,754 | B2 * | 6/2008 | Holmdahl et al. | 123/26 |
| 7,722,015 | B2 * | 5/2010 | Koizumi | 261/23.3 |
| 2003/0106509 | A1 * | 6/2003 | Uenoyama et al. | 123/73 PP |

FOREIGN PATENT DOCUMENTS
EP 1 134 380 A2 9/2001
* cited by examiner

*Primary Examiner* — Noah Kamen
*Assistant Examiner* — Hung Q Nguyen
(74) *Attorney, Agent, or Firm* — Gudrun E. Huckett

(57) ABSTRACT

A carburetor has a carburetor housing in which an air passage and a mixture passage are disposed. A barrel valve controls the air passage and the mixture passage. The barrel valve has a mixture passage section and an air passage section formed therein. The air passage in at least one position of the barrel valve is closed off at least partially by the barrel valve. The air passage in the at least one position of the barrel valve in which the air passage is at least partially closed off by the barrel valve is connected by a connection within the barrel valve with the mixture passage. An internal combustion engine equipped with such a carburetor exhibits excellent running behavior.

19 Claims, 3 Drawing Sheets

CARBURETOR AND TWO-STROKE ENGINE WITH A CARBURETOR

BACKGROUND OF THE INVENTION

The invention relates to a carburetor comprising a carburetor housing in which an air passage and a mixture passage are disposed, wherein the carburetor has a common barrel valve for controlling the air passage and the mixture passage. In the barrel valve a mixture passage section and an air passage section are formed. The air passage, in at least one position of the barrel valve, is closed off at least partially by the barrel valve.

The invention furthermore relates to a two-stroke engine with a carburetor wherein the two-stroke engine comprises a cylinder in which a combustion chamber is disposed that is delimited by a piston. The piston drives in rotation a crankshaft that is supported rotatably in a crankcase. The crankcase, in at least one position of the piston, is connected by at least one transfer passage with the combustion chamber. The two-stroke engine comprises a mixture passage, an air passage, and a carburetor that has a common barrel valve for controlling the air passage and the mixture passage. The air passage, in at least one position of the barrel valve, is at least partially closed off by the barrel valve.

EP 1 134 380 A2 discloses a two-stroke engine with a carburetor that comprises a barrel valve. The two-stroke engine has an air passage and a mixture passage that each have a separate control opening in the barrel valve. An additional connecting channel between the air passage and the mixture passage is provided that is controlled by a further control valve. At idle and low load the connecting channel is open.

SUMMARY OF THE INVENTION

It is an object of the present invention to provide a carburetor and a two-stroke engine with a carburetor that have a simple configuration and an excellent running and vibration behavior even at idle and partial load.

In accordance with the present invention, this is achieved in connection with the carburetor in that the air passage, in the position of the barrel valve in which the air passage is closed off at least partially by the barrel valve, is connected through the barrel valve to the mixture passage.

In accordance with the present intention, this is achieved in connection with the two-stroke engine in that the air passage, at least in the position in which the air passage is closed off at least partially by the barrel valve, is connected through the barrel valve to the mixture passage.

By providing that the air passage is connected by the barrel valve to the mixture passage, a separate connection and a separate valve for controlling this connection are no longer needed. The connection and thus also the control of the connection are integrated in the barrel valve. By providing that mixture can pass through the mixture passage into the air passage in the at least partially, particularly even completely, closed state of the air passage, a satisfactory fuel supply is achieved and an excessively lean mixture upon opening of the air passage is avoided. In this way, a calm and stable running of the two-stroke engine and an excellent vibration behavior, even at low engine speeds and in partial load operation, are made possible.

A simple configuration results when the connection in the barrel valve connects downstream of the barrel valve the mouth of the mixture passage section formed in the barrel valve with the air passage. The connection is in particular formed by a recess in the outer circumference of the barrel valve. Such a recess is producible in a simple way. By means of the position of the recess the desired control timing can be adjusted. A simple connection between the mouth and the recess can be achieved when the recess intersects the mouth of the mixture passage section. A simple configuration results when the recess is formed as a flattened portion of the circumferential wall of the barrel valve.

The recess is advantageously arranged on the circumference of the barrel valve such that, when the barrel valve is completely open, no connection to the air passage and to the mixture passage exists. This can be achieved in that the recess is arranged in an area of the circumference of the barrel valve that upon rotation of the barrel valve into the completely open position moves out of the area of the air passage and the mixture passage into the wall area of the carburetor.

Advantageously, the air passage and the mixture passage are separated at least partially from one another by a partitioning wall wherein a partitioning wall section of the partitioning wall is formed on the barrel valve. The air passage and the mixture passage are therefore at least partially not embodied as two separate tubes but as one tube that is divided by the partitioning wall. The passages can therefore be produced as bores into which, in the longitudinal direction, a partitioning wall is inserted or on which a partitioning wall is integrally formed. In this way, manufacture can be simplified. By providing that a partitioning wall section is formed on the barrel valve, a complete separation of air passage and mixture passage, with the exception of the desired connection, can be achieved in a simple way. Advantageously, the partitioning wall section of the barrel valve is interrupted by the recess. In this way, the connection between air passage and mixture passage can be generated in a simple way. In the completely open position of the barrel valve it is provided that the partitioning wall section separates the mixture passage section and the air passage section completely from one another.

Expediently, the axis of rotation of the barrel valve extends transversely to the plane of the partitioning wall section. In order to enable a minimal size and in order to enable in a simple way an excellent adaptation of the control timing, it is provided that the mixture passage section and the air passage section have different cross-sectional shapes. The cross-sections of air passage and mixture passage advantageously are not round but deviate from a circular shape. Particularly advantageous for reducing the height of the carburetor are flat cross-sections of air passage and mixture passage. Advantageously, upon rotation of the barrel valve from the closed position into the open position, the air passage opens after the mixture passage. In this way, the supply of scavenging air through the air passage is delayed. This improves the running behavior of the engine at low engine speed. Advantageously, the air passage in at least one position of the barrel valve is completely closed off by the barrel valve. In particular, the air passage is connected with the mixture passage through the barrel valve in a position of the barrel valve in which the air passage is completely closed off by the barrel valve. In this way, when the air passage is completely closed, in particular at idle, mixture from the mixture passage is supplied through both passages.

For a two-stroke engine with one cylinder in which a combustion chamber is formed that is delimited by a piston, wherein the piston drives a crankshaft that is rotatably supported in a crankcase, wherein the crankcase in at least one position of the piston is connected by at least one transfer passage with the combustion chamber, with a mixture passage, with an air passage, with a carburetor that has a common barrel valve for controlling the air passage and the mixture passage, wherein the air passage in at least one position of the barrel valve is closed off at least partially by the barrel valve, it is provided that the air passage, at least in the position in which the air passage is at least partially closed by the barrel valve, is connected through the barrel valve to the mixture passage.

In this way, mixture can be supplied to the air passage in a simple way in order to improve in this way the running behavior and vibration behavior of the two-stroke engine in particular at low engine speeds and in partial load operation. Expediently, the connection exists at idle and partial load. At full load of the internal combustion engine, the connection is advantageously closed.

A simple configuration of the air passage and the mixture passage results when the two stroke engine has an intake passage that is divided by at least one partitioning wall across a section of its length into the air passage and the mixture passage. Expediently, a partitioning wall section of the partitioning wall is formed on the barrel valve. In this way, an excellent separation of air passage and mixture passage, in particular at full load of the two-stroke engine, can be achieved in a simple way. Advantageously, the flow cross-sections of air passage and mixture passage are of different size in completely open position of the barrel valve. In this connection, in particular the flow cross-section of the air passage is greater than the flow cross-section of the mixture passage. It has been found that in this way excellent exhaust gas values can be achieved.

DESCRIPTION OF THE PREFERRED EMBODIMENTS

Figure 1:
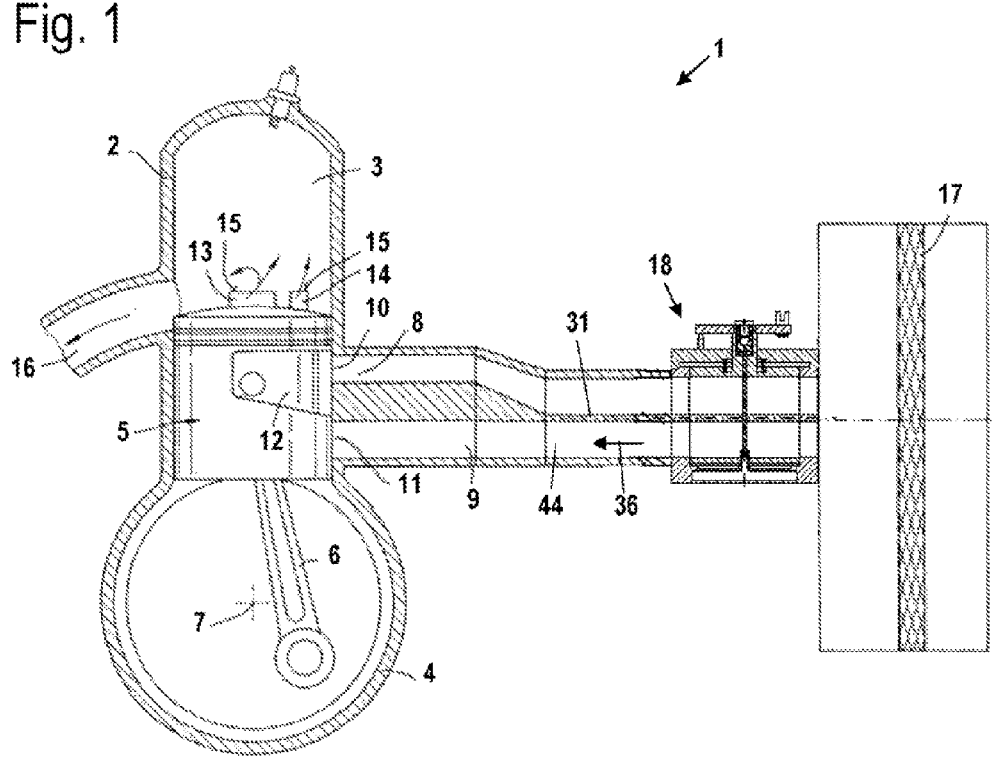
FIG. 1 is a schematic section illustration of a two-stroke engine.

FIG. 1 illustrates a two-stroke engine 1 that operates with scavenging air. The two-stroke engine 1 is embodied as a single cylinder engine and has a cylinder 2 in which a combustion chamber 3 is formed. The combustion chamber 3 is delimited by a piston 5 that is supported in a reciprocating way within the cylinder 2. The piston 5 rotatably drives by means of a connecting rod 6 the crankshaft 7 that is rotatably supported in the crankcase 4. The two-stroke engine 1 can be, for example, used as a drive motor in a hand-held power tool such as a motor chainsaw, a trimmer, a cut-off machine, a lawn mower or the like. The crankshaft 7 drives in this case a tool member of the power tool.

A mixture intake 11 of the passage 9 opens at the cylinder 2 into the crankcase 4 and is piston-controlled by piston 5. An air passage 8 with air inlet 10 also opens at the cylinder 2; the air inlet 10 is connected in the area of the top dead center of the piston 5 by means of piston recess 12 provided within the piston 5 with transfer ports 15 of transfer passages 13 and 14.

In the area of the bottom dead center of the piston 5 shown in FIG. 1, the transfer passages 13, 14 connect the interior of the crankcase 4 with the combustion chamber 3 so that the fuel/air mixture can be transferred from the crankcase 4 into the combustion chamber 3. An outlet 16 for exhaust gas leads away from the combustion chamber 3.

The two-stroke engine 1 has an intake passage 44 divided by a partitioning wall 31 into the air passage 8 and the mixture passage 9. The intake passage 44 connects the cylinder 2 with an air filter 17. A section of the intake passage 44 is formed within the carburetor 18. From the air filter 17 the combustion air flows in flow direction 36 to the cylinder 2.

In operation, the two-stroke engine 1 takes in fuel/air mixture from the mixture passage 9 into the crankcase 4 upon upward stroke of the piston 5. Upon downward stroke of the piston 5, the mixture in the crankcase 4 is compressed and flows in the area of the bottom dead center of the piston 5 through the transfer passages 13, 14 into the combustion chamber 3. In the area of the top dead center the mixture is ignited in the combustion chamber 3 and accelerates the piston 5 in the direction of the crankcase 4. As soon as the outlet 16 opens, the exhaust gases will escape from the combustion chamber 3. In order to prevent that fresh fuel/air mixture will flow directly from the crankcase 4 into the outlet 16, it is provided that fuel-depleted or substantially fuel-free combustion air from the air passage 8 is stored in the transfer passages 13 and 14. This is realized by means of the piston recess 12. Upon transfer, the fuel-depleted or fuel-free combustion air of air passage 8 separates the exhaust gases in the combustion chamber 3 from the incoming fresh mixture so that scavenging losses are reduced.

It has been found that in particular at idle and during partial load the stored fuel-depleted and fuel-free air in the transfer passages 13, 14 leads to great fluctuations of the mixture composition and thus to irregular running of the two-stroke engine 1. In order to avoid this, it is provided to supply mixture from the mixture passage 9 to the air passage 8 at idle and partial load. This will be explained in the following in more detail.

Figure 2:
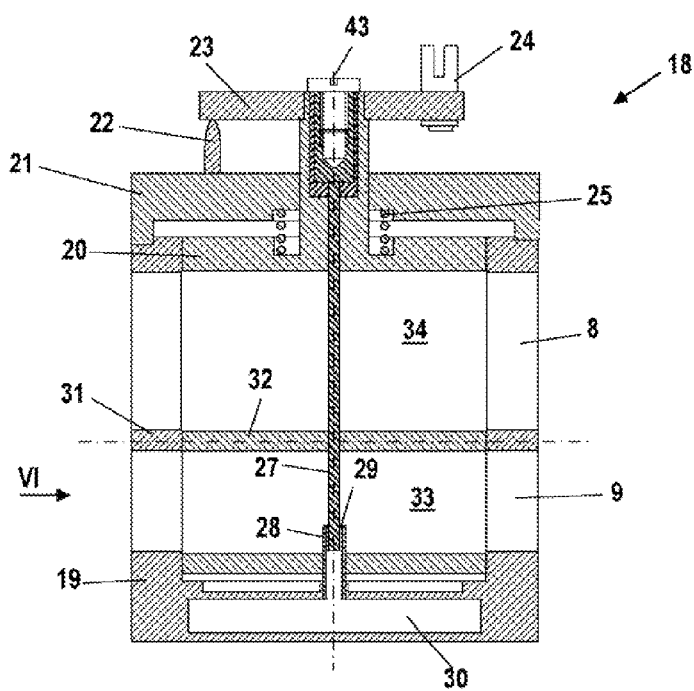
FIG. 2 is a schematic section illustration of the carburetor of the two-stroke engine of FIG. 1.

In FIG. 2, the configuration of the carburetor 18 is illustrated in detail. The carburetor 18 is embodied as a barrel valve carburetor. It has a carburetor housing 19 in which a barrel valve 20 is rotatably supported about axis of rotation 43. In the barrel valve 20 a mixture passage section 33 and an air passage section 34 are formed. The barrel valve 20 is fixedly attached to a lever 23 that is arranged on the exterior side of the carburetor housing 19. The lever 23 is resting against a cam contour 20 arranged on a lid 21 of the carburetor housing 19. The barrel valve 20 is loaded by a pressure spring 25. On the lever 23 an actuating pin 24 is also secured to which is attached a throttle cable.

Upon pivoting of the lever 23, the lever 23 glides along the cam contour 22 and pulls the barrel valve 20 against the force of the pressure spring 25 toward the cam contour 22 out of the carburetor housing 19. On the barrel valve 20 a metering needle 27 is secured that projects into the fuel opening 28.

Between the metering needle 27 and the fuel opening 28 an annular gap 29 is formed. When the barrel valve 20 is pulled against the cam contour 22, the metering needle 27 is pulled out of the fuel opening 28 and the cross-section of the annular gap 29 is enlarged. In this way, more fuel can flow out of the fuel chamber 30 into the mixture passage section 33. As shown in FIG. 2, the mixture passage section 33 and the air passage section 34 are separated by a partitioning wall section 32 that is integrally formed on the barrel valve 20 and that extends transversely, in particular perpendicularly, to the axis of rotation 43 and extends in the same plane as the partitioning wall 31. As shown in FIG. 2, the height of the mixture passage section 33 measured in the direction of the axis of rotation 43 is smaller than the height of the air passage section 34. The flow cross-section of the air passage 8 is greater than that of the mixture passage 9.

Figure 3:
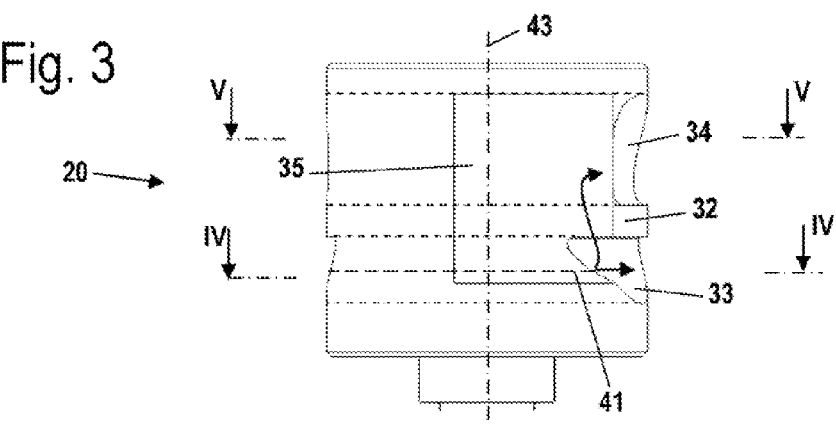
FIG. 3 is side view of the barrel valve of the carburetor of FIG. 2.

FIG. 3 shows a plan view of the barrel valve 20. The barrel valve 20 is substantially cylindrical. The mixture passage section 33 and the air passage section 34 extend transversely to the axis of rotation 43 in the form of through openings. The barrel valve 20 has a recess 35 at its outer circumference that is embodied as a flattened portion. By means of the recess 35 fuel/air mixture from the mixture passage section 33 can flow between the barrel valve 20 and the carburetor housing 19 in the direction of arrow 41 into the air passage 8.

Figure 4:
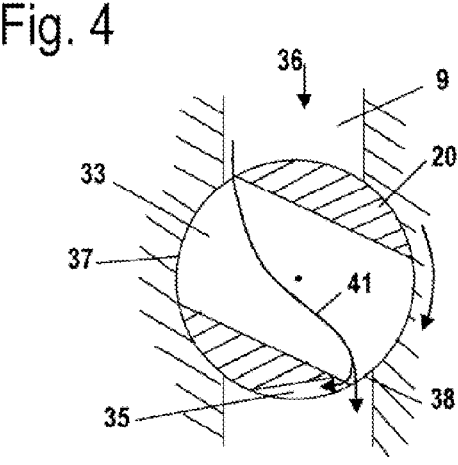
FIG. 4 is a schematic section view of the carburetor at idle at the level of the section line IV-IV in FIG. 3.

FIG. 4 shows a section through the mixture passage 9. As shown in this Figure, the upstream mouth 37 of the mixture passage section 33 is partially open with respect to the upstream section of the mixture passage 9. Correspondingly, the downstream mouth 38 of the mixture passage section 33 is open partially relative to the downstream section of the mixture passage 9. Moreover, the mouth 38 communicates with the recess 35. The recess 35 that is formed as a flattened portion intersects the mouth 38. In this way, combustion air that is taken in through the air filter 17 into the mixture passage 9 and has been supplied with fuel in the mixture passage section 33 by means of annular gap 29 (FIG. 2) can be sucked into the mixture passage downstream of the barrel valve 20 as well as into the recess 35.

Figure 5:
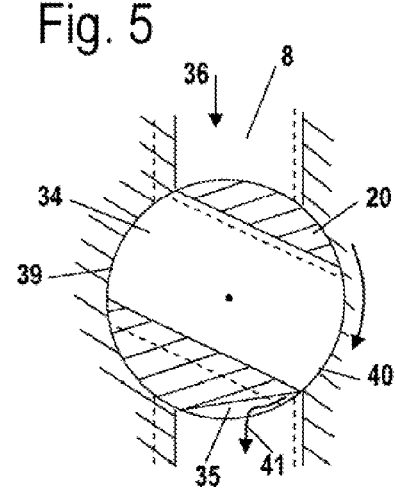
FIG. 5 is a schematic section of the carburetor at idle at the level of the section line V-V in FIG. 3.
Figure 6:
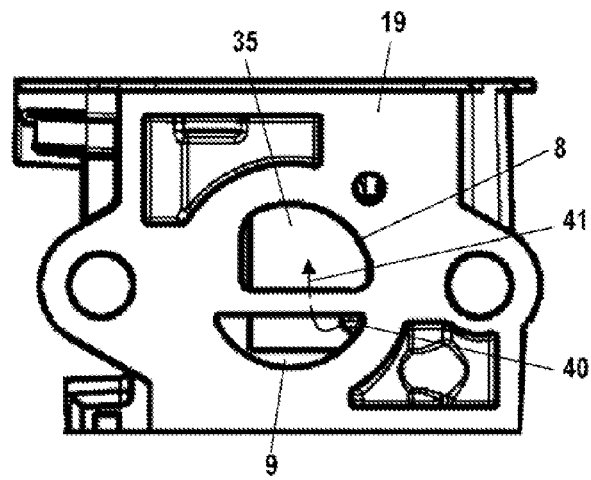
FIG. 6 is a side view of the carburetor in the direction of arrow VI in FIG. 2 in the position of the barrel valve as shown in FIGS. 4 and 5.

FIG. 5 shows that the mixture can pass in the direction of arrow 41 through the recess 35 downstream of the barrel valve 20 into the air passage 8. The upstream mouth 39 of the air passage section 34 and the downstream mouth 40 of the air passage section 34 are still completely closed off. In the idle position illustrated in FIGS. 4 and 5, fuel/air mixture from the mixture passage 9 can therefore also be sucked into the air passage 8 through the recess 35. This is also illustrated in FIG. 6. Here it is also shown that the recess 35 intercepts the mouth 40.

Figure 7:
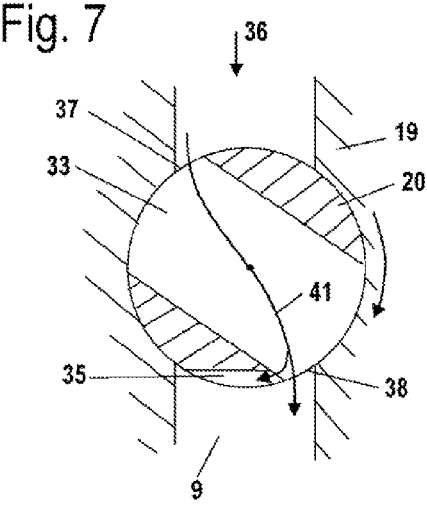
FIG. 7 is a schematic section view of the mixture passage of the carburetor with the barrel valve shown in partial load position.
Figure 8:
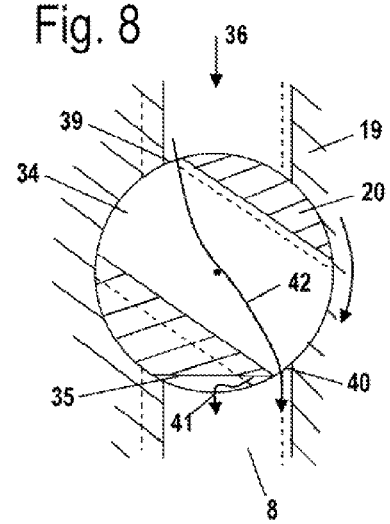
FIG. 8 is a section of the air passage of the carburetor with the barrel valve in partial load position.
Figure 9:
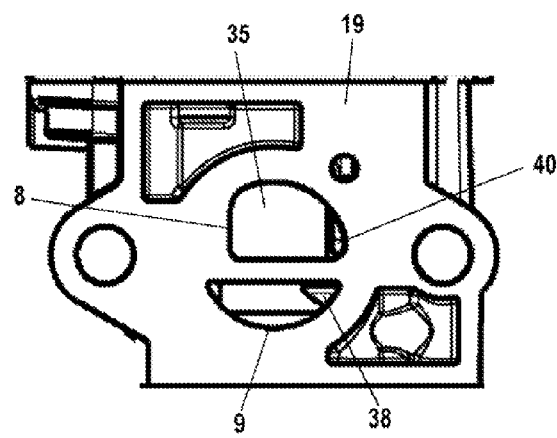
FIG. 9 is a side view of the carburetor looking in the direction of arrow VI of FIG. 2 onto the carburetor with the barrel valve in partial load position.

The FIGS. 7 to 9 show the barrel valve 20 in partial load position. As shown in FIG. 7, the mouths 37 and 38 are partially open so that the combustion air can be sucked into the mixture passage section 33 and supplied with fuel. In the direction of arrow 41 the combustion air then enters the mixture passage 9 as well as the area of the recess 35. As shown in FIG. 8, the fuel/air mixture passes from the area of the recess 35 into the air passage 8 downstream of the barrel valve 20. As shown in FIG. 8, the mouths 39 and 40 in this position of the barrel valve 20 are partially open so that combustion air can be sucked through the air passage section 34 also into the air passage 8. As shown in FIG. 9 the mouths 38 and 40 are open. The recess 35 is still within the area of the air passage 8 and the mixture passage 9 so that mixture from the mixture passage 9 can still pass into the air passage 8 through the recess 35.

Figure 10:
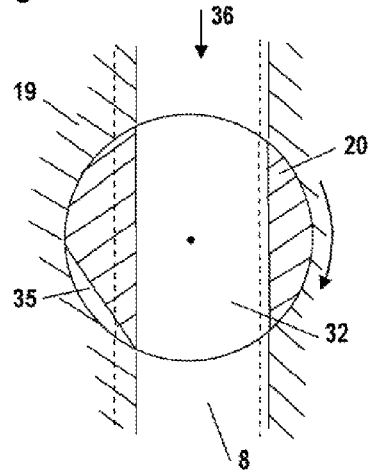
FIG. 10 is a schematic section illustration of the air passage of the carburetor with the barrel valve in full load position.
Figure 11:
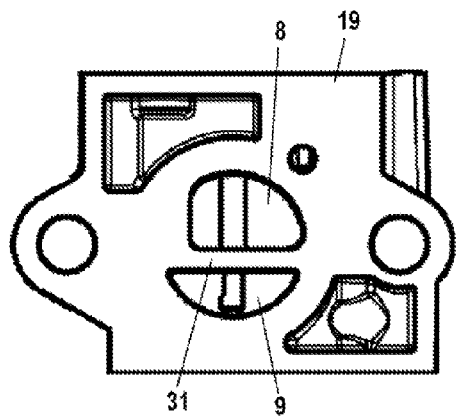
FIG. 11 is a side view of the carburetor in the direction of arrow VI of FIG. 2 with the barrel valve in full load position.

FIGS. 10 and 11 show the barrel valve 20 in full load position. In this position all mouths 37, 38, 39 and 40 are completely open. The recess 35 is however closed. The recess 35 is located in the area of the carburetor housing 19 and is completely covered by the wall of the carburetor housing 19 so that a connection no longer exists between the recess 35 and the air passage 8 as well as the mixture passage 9. In this way, no mixture from the mixture passage 9 can pass through the recess 35 into the air passage 8. The air passage 8 and the mixture passage 9 are completely separated from one another by the partitioning wall 31 and the partitioning wall section 32 within the barrel valve 20.

FIG. 11 shows that the cross-sectional shapes of air passage 8 and mixture passage 9 deviate from a circular shape. The irregular cross-sectional shape is matched to the desired ratio of mixture and combustion air so that an excellent running behavior of the internal combustion engine can be achieved. Other cross-sectional shapes of air passage 8 and mixture passage 9 may be expedient also.

The specification incorporates by reference the entire disclosure of German priority document DE 10 2009 030 593.9 having a filing date of Jun. 26, 2009.

While specific embodiments of the invention have been shown and described in detail to illustrate the inventive principles, it will be understood that the invention may be embodied otherwise without departing from such principles.

What is claimed is:

1. A carburetor comprising:
a carburetor housing in which an air passage and a mixture passage are disposed;
a barrel valve controlling said air passage and said mixture passage, wherein said barrel valve has a mixture passage section and an air passage section formed therein;
wherein said air passage in at least one position of said barrel valve is dosed off at least partially by said barrel valve;
wherein said air passage in said at least one position of said barrel valve in which said air passage is at least partially closed off by said barrel valve is connected by a connection within said barrel valve with said mixture passage.

2. The carburetor according to claim 1, wherein said connection within said barrel valve connects a mouth of said mixture passage section formed in said barrel valve with said air passage downstream of said barrel valve.

3. The carburetor according to claim 2, wherein said connection within said barrel valve is a recess on an outer circumference of said barrel valve.

4. The carburetor according to claim 3, wherein said recess intercepts said mouth of said mixture passage section.

5. The carburetor according to claim 3, wherein said recess is a flattened portion of a circumferential wall of said barrel valve.

6. The carburetor according to claim 3, wherein said recess is arranged on said outer circumference of said barrel valve such that, when said barrel valve is completely open, said recess has no connection to said air passage and to said mixture passage.

7. The carburetor according to claim 1, wherein said air passage and said mixture passage at least partially are separated from one another by a partitioning wall wherein a partitioning wall section of said partitioning wall is formed on said barrel valve.

8. The carburetor according to claim 7, wherein said partitioning wall section of said barrel valve is interrupted by said recess.

9. The carburetor according to claim 7, wherein said partitioning wall section completely separates said mixture passage section and said air passage section in a completely open position of said barrel valve.

10. The carburetor according to claim 7, wherein an axis of rotation of said barrel valve extends transversely to a plane of said partitioning wall section.

11. The carburetor according to claim 1, wherein said mixture passage section and said air passage section have different cross-sectional shapes.

12. The carburetor according to claim 11, wherein said air passage upon rotation of said barrel valve from a closed position into an open position opens after said mixture passage.

13. The carburetor according to claim 1, wherein said air passage is completely closed off by said barrel valve, when said connection of said barrel valve connects said air passage and said mixture passage.

14. A two-stroke engine comprising:
   a cylinder in which a combustion chamber is disposed that is delimited by a reciprocating piston driving in rotation a crankshaft supported rotatably in a crankcase, wherein said crankcase in at least one position of said piston is connected by at least one transfer passage to said combustion chamber;
   a mixture passage connected to said cylinder;
   an air passage connected to said cylinder;
   a carburetor comprising a barrel valve for controlling said air passage and said mixture passage;
   wherein said air passage in at least one position of said barrel valve is at least partially closed off by said barrel valve;
   wherein said air passage, at least in said at least one position of said barrel valve in which said air passage is at least partially closed off by said barrel valve, is connected by a connection in said barrel valve with said mixture passage.

15. The two-stroke engine according to claim 14, wherein said connection exists at idle or at low partial load of the two-stroke engine.

16. The two-stroke engine according to claim 14, wherein said connection is closed at full load of the two-stroke engine.

17. The two-stroke engine according to claim 14, wherein the two-stroke engine has an intake passage that is divided into said air passage and said mixture passage by a partitioning wall at least across a section of a length of said intake passage.

18. The two-stroke engine according to claim 17, wherein a partitioning wall section of said partitioning wall is integrally formed on said barrel valve.

19. The two-stroke engine according to claim 14, wherein a flow cross-section of said air passage and a flow cross-section of said mixture passage are differently sized when said barrel valve is in completely open position.

* * * * *